Feb. 15, 1944.  A. F. SMITH  2,341,823
ARTIFICIAL FILAMENT
Filed June 13, 1941  3 Sheets-Sheet 1
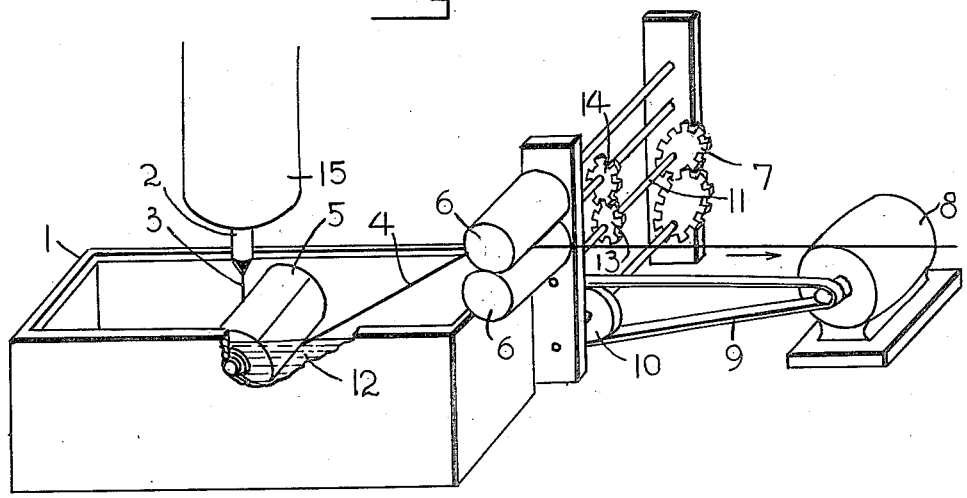
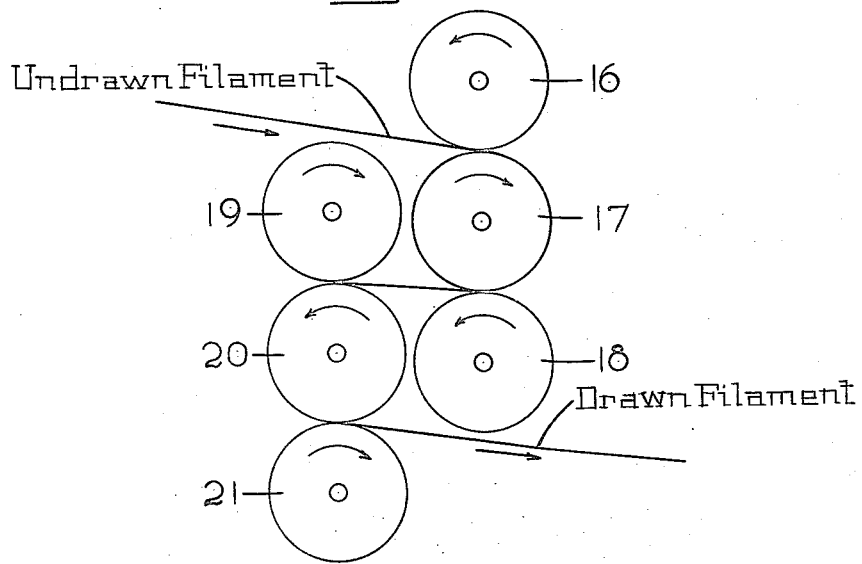
INVENTOR.
Albert F. Smith
BY Harold A. Jewett
ATTORNEY Feb. 15, 1944.  A. F. SMITH  2,341,823
ARTIFICIAL FILAMENT
Filed June 13, 1941   3 Sheets-Sheet 2
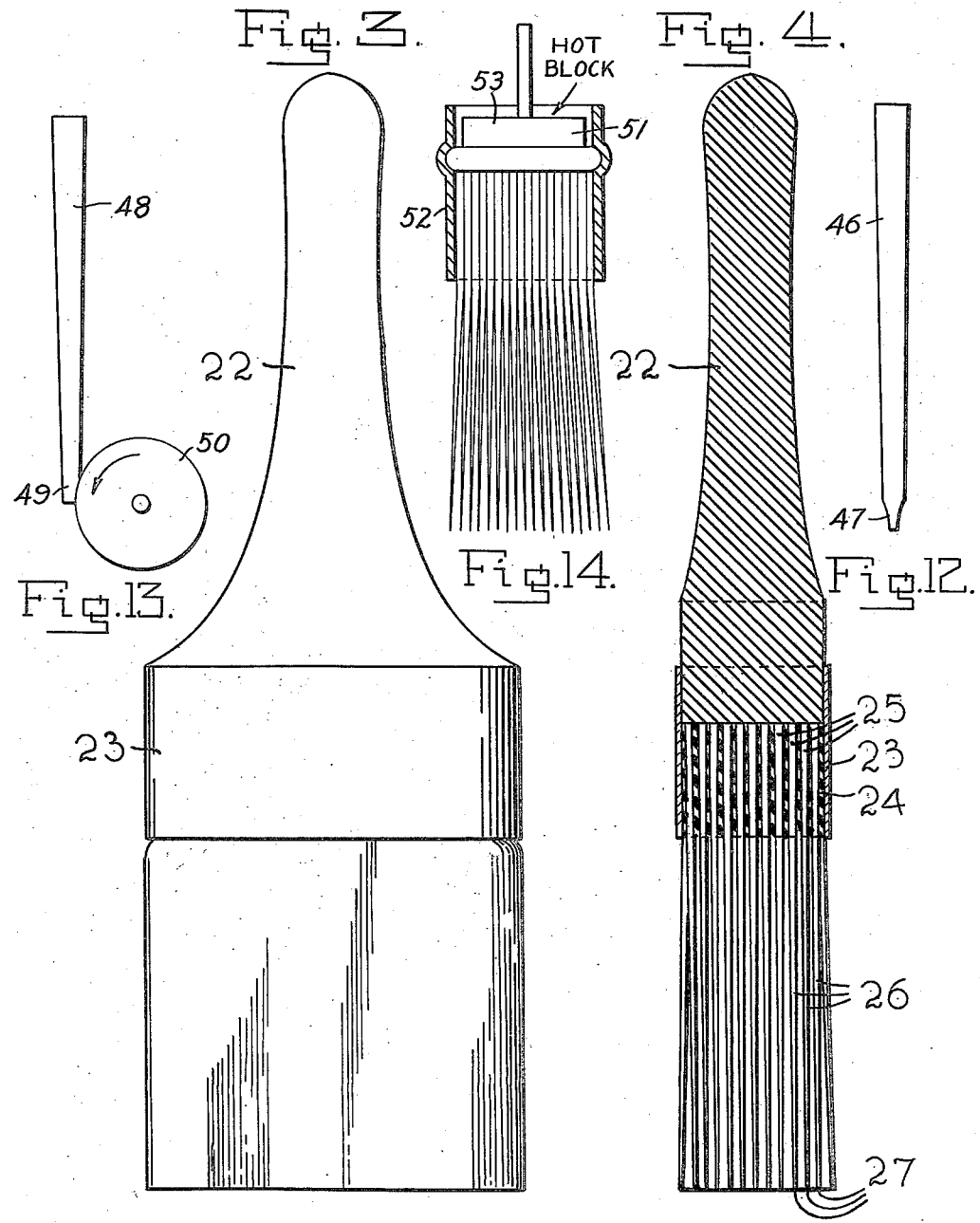
INVENTOR.
Albert F. Smith
BY Harold A. Jewett
ATTORNEY

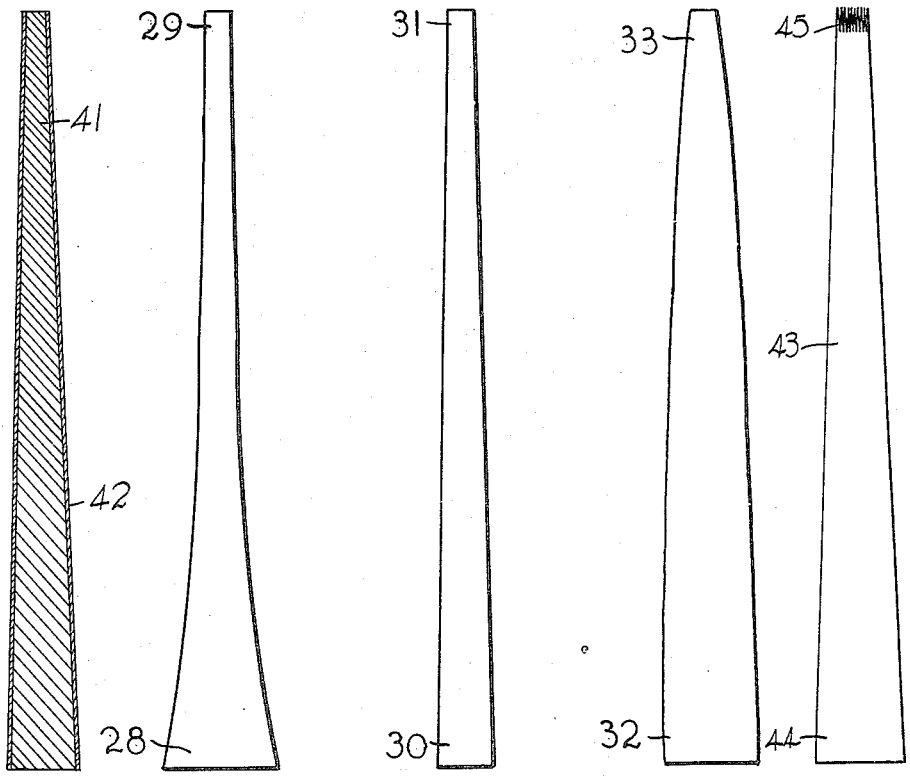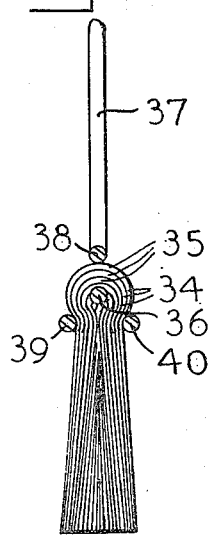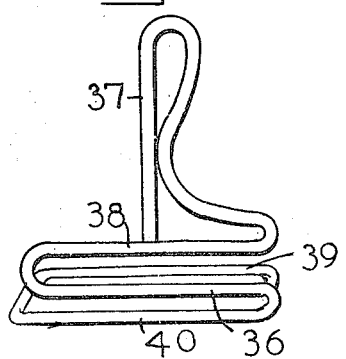

Patented Feb. 15, 1944

2,341,823

UNITED STATES PATENT OFFICE 2,341,823

ARTIFICIAL FILAMENT

Albert Faris Smith, Wilmington, Del., assignor to E. I. du Pont de Nemours & Company, Wilmington, Del., a corporation of Delaware Application June 13, 1941, Serial No. 397,887

12 Claims. (Cl. 15—159)

This invention relates to tapered synthetic filaments, and more particularly to large regularly tapered filaments useful as bristles and as fishing tackle elements and to their manufacture.

This application is a continuation-in-part of my application Serial Number 283,082, filed July 6, 1939, now Patent 2,292,905, which in turn is a continuation-in-part of my application Serial Number 232,683, filed September 30, 1938.

Tapered objects are frequently employed where good handle and maximum resilience of an elongated object is desired. Thus in making high quality paintbrushes, hog bristle, which is always tapered, is invariably used; horsehair, which is similar in composition to hog bristle but possesses no taper, cannot be used successfully. Although hog bristle has been the most satisfactory material available for making paintbrushes up to the present time, it possesses a number of serious disadvantages. The supply of bristle is uncertain at best and it is steadily diminishing because of the tendency to raise hogs which, though they furnish better meat, produce inferior bristle. Furthermore, hog bristles are very irregular in size and shape, so that they must be laboriously sorted by hand into definite lengths which can then be used in paintbrush preparation. This nonuniformity necessitates the maintenance by brush concerns of a staff of bristle experts whose duty is to change the formulation of the brushes to accommodate the varying quality of the bristles. All these factors tend to make dressed hog bristles, and consequently brushes, quite expensive. Past attempts to make substitutes for hog bristles, for example from such materials as sisal, tampico, regenerated animal fibers, and cellulosic materials, have been unsuccessful.

Another field in which the value of taper has been recognized is fishing tackle. In order to obtain the best casting characteristics, fishermen demand not only tapered rods but also tapered lines and leaders. At present tapered leaders are made by tying together sections of level gut in decreasing sizes, but it is impossible by this procedure to obtain a knotless leader which tapers smoothly from one end to the other. Tapered lines are prepared by braiding together a large number of fine threads and varying the number of threads at intervals, but this procedure is laborious and time consuming and gives tapered fishing lines which are expensive and not altogether satisfactory in strength or uniformity. It is apparent therefore that fishing tackle free from the above difficulties would be of great interest to fishermen.

It is therefore an object of this invention to obtain new and useful tapered filaments characterized by high strength, good resiliency, and good handle. Another object is to obtain tapered filaments in which the diameter varies in a regular manner along the length of the filament. Still another object is to obtain regularly tapered filaments useful as bristles, fishing leaders, and fishing lines. A more specific object is to obtain tapered bristles having a high taper ratio and to fabricate them into brushes. Other objects will appear as the description proceeds.

These objects are attained by the procedure particularly described below, as well as in my hereinabove-mentioned application Serial Number 283,082, now Patent 2,292,905, which procedure comprises, in its broader aspects, extruding a filament-forming synthetic polymer from a spinneret in predetermined form and causing at repeated intervals uniform variation in the mass of polymer passing a given point beyond the spinneret, said uniform variation arising from a variation in the take-off rate and/or the rate of extrusion, and then cold drawing the filament and cutting it in the desired lengths. The more usually preferred tapered filaments or bristles of the invention are obtained by extruding synthetic linear polyamide filaments of average diameter ranging from 5 to 200 mils in the manner indicated above, cold drawing the filaments between closely spaced draw points, and cutting the drawn filaments at the thick or thin sections or both. The resulting filaments or bristles are then incorporated into the stock of a brush handle, in one of the ways designated hereinafter.

I realize that the preparation of uneven denier continuous filaments has been described previously, but these filaments have been of textile dimensions for use in making novelty yarns and fabrics. To enhance the novelty effect, the variation in denier has been irregular with short very thick sections or nubs scattered along the length of the yarn, and there has been no improvement in resiliency. Such yarns are never cut at the thick or thin sections, a procedure which is very important in preparing resilient objects according to the present invention. It should be noted, however, that the prior art filaments and fibers were not cold drawn nor were they in fact susceptible to cold drawing. The problem of making individually tapered filaments from a filament-forming material which requires cold drawing to attain its maximum usefulness has not previously been met. This problem presents difficulties because the force required to cold draw the thick sections is frequently sufficient to break the thin sections. This difficulty is particularly acute when it is desired to convert such a filament-forming material into oriented bristles having the high taper ratio of those which form a particular object of this invention. As far as I am aware, the spinning of regularly tapered bristles from any filament-forming material, regardless of whether it requires a cold drawing or not, is an unknown art.

I have now found that by using the process and materials described herein tapered filaments can be produced which are far superior to natural bristles or to fishing tackle of the prior practice. The synthetic polyamide bristles of the invention have excellent snap and resilience, uniform size, shape, and properties, and may be used to prepare brushes having excellent qualities. In addition to the advantages which result from the uniformity of the bristles, such as elimination of the necessity for tedious sorting and handling of bristle, the bristle of the invention is resistant to attack by moths and organisms and to paint solvents, withstands the high temperatures used in the vulcanization of bristles into brushes, and possesses surprising wearing qualities. In standard abrasion tests in which a paintbrush made of synthetic bristle was compared with one made of hog bristle, the synthetic bristle brush showed less than half as much wear as the hog bristle brush, thus indicating that my brushes will outlast conventional brushes at least two-fold.

The importance of taper in the production of the synthetic bristle for use in paintbrushes is emphasized by the fact that, although untapered bristles are quite satisfactory for making toothbrushes, all attempts to prepare a satisfactory paintbrush from untapered synthetic polyamide bristles have been unsuccessful. The degree of taper is important for bristles to be used in paintbrushes. For this use the "taper ratio," i. e., the ratio of the diameter of the large end of the bristle to the diameter of the small end, should in general be between 1.5 and 3.5, and the bristle length should not exceed 15 inches and will usually be between about 2.5 and 12 inches.

A convenient method for carrying out the invention consists in extruding a filamentary stream of molten fiber-forming synthetic polyamide from an orifice through a quenching bath to a take-off mechanism which is run with a uniformly varying speed to secure a regular variation in the diameter of the filament. After the tapered filament has been spun, is is preferably soaked in water or other mild swelling agent therefor and then elongated from 200 to 700% of its original length, preferably about 400% in the case of polyhexamethylene adipamide. By treating the filament after the cold drawing operation with hot water, steam or other mild swelling agent for the polymer, it is set in the shape in which it is submitted to such treatment and so is given good resistance to deformation. This procedure is important in the preparation of bristles, and it is used to advantage also in the preparation of fishing lines and leaders, since it reduces their tendency to set in coils or tangles. After the cold drawing treatment (and after the setting treatment, if it is so desired), the filament is cut at the thin or thick sections, or both, depending on the purpose for which it is to be used.

Fig. 1 in the accompanying drawings is a perspective view of a form of mechanism used in carrying out the invention;

Fig. 2 is a diagrammatic view in elevation of a mechanism for cold-drawing the tapered filament obtained by the apparatus of Fig. 1;

Fig. 3 is a schematic front view illustration of the brush referred to in the paragraph following Table I, hereinbelow;

Fig. 4 is a longitudinal side view, in cross-section, of the brush depicted in Fig. 3, and shows in particular detail the taper of the bristles;

Figs. 5–7 are drawings, on a greatly magnified scale, of types of bristles produced in accordance with the invention;

Fig. 8 is a side view, in longitudinal cross-section, of the brush referred to in Example IV;

Fig. 9 is a diagrammatic sketch of the handle and bristle retaining structure of the brush shown in Fig. 8.

Fig. 10 shows on a greatly magnified scale in longitudinal cross section a tapered filament or bristle 41 produced in accordance with the invention and coated with a polymer 42.

Fig. 11 shows on a greatly magnified scale in longitudinal side view a tapered bristle 43 comprising a plurality of tapered filaments composed essentially of synthetic linear polymer and arranged with their portions of maximum thickness 44 in mutual and substantially parallel juxtaposition, the filaments being fusion sealed together at the portions of maximum thickness and substantially throughout their length but the portions of minimum thickness being mutually separable to form a flagged tip 45.

Fig. 12 shows on a greatly magnified scale in longitudinal side view a tapered bristle 46 having a pointed tip 47.

Fig. 13 shows on a greatly magnified scale in longitudinal side view a tapered bristle 48 having a tip 49 given a chisel edge contour by an abrasive wheel 50.

Fig. 14 shows in longitudinal cross section a brush similar to that shown in Figs. 3 and 4, except that no rubber member 24 is required in which to set the bristles as the butt ends 51 of the tuft of bristles are heat fused together in the ferrule 52 as by means of a hot block 53.

Referring to Fig. 1 particularly: The molten polymer contained in the reservoir 15, passes through the spinneret 2 which is provided with a number of small holes through which the polymer is extruded in the form of a plurality of filaments 3. These filaments combine to a single bundle of filaments 4 which is drawn around the guide roll 5 by the pinch rolls 6 from which the filament bundle passes to a windup roll (not shown). The roll 5 is journaled in the receptacle 1 and is partly submerged in the water 12 contained therein, which quenches the hot filaments as they are extruded from the spinneret. The pinch rolls 6, which are preferably made of soft rubber, are driven through the meshing gears 13 and 14 by the meshing elliptic gears 7. The speed of the pinch rolls varies regularly during the course of each revolution of the elliptic gears or cams 7. By changing the relative size of the meshing gears 13 and 14, the fraction of a revolution of the pinch rolls represented by a revolution of the elliptic gears may be varied at will so that various lengths of tapered bristle may be spun. The lower elliptic gear is driven by the motor 8 through chain 9 and sprocket 10. The variation in the speed of the pinch rolls causes a corresponding variation in the speed at which the filaments 3 are drawn from the spinneret 2. As a result, the filaments have regularly spaced lengths of smooth taper. It is possible to operate the spinning machine of Fig. 1 without the gears 13 and 14 by driving the pinch rolls directly with the shaft to which the upper elliptic gear is attached, but such an apparatus is restricted to the preparation of tapered filaments of a given length and is therefore less adaptable than the apparatus shown in the drawings.

To secure good results in the practice of this invention, several precautions must be taken. In the spinning operation care must be taken that the filaments in the quenching bath between the spinneret and the take-off mechanism shall not pass around sharp corners or meet with excessive resistance, which might cause them to stretch. Otherwise, a damping out of the motion of the take-off mechanism, which imparts the regular variation in diameter to the filament, might occur. The subsequent step of cold drawing is even more critical. For example, in the production of bristle which is four inches long in the final cold drawn state and has a taper ratio of 2.0, it is necessary to spin a filament in which the distance between the thick and thin sections of the undrawn filament is one inch and the diameter of the thin section is half that of the thick section. Since the force required to cold draw such filaments closely approaches the breaking strength of the filament at the thin sections, extraordinary measures must be taken in cold drawing to prevent breakage during the cold-drawing. The filaments therefore are preferably first soaked in some liquid such as water which improves the cold drawing properties, and then cold drawn on a machine in which the draw points are very close together. One type of machine suitable for cold drawing such bristles is shown in Fig. 2.

By the use of elevated temperatures, with or without prior water soaking of the filaments, it is possible to facilitate greatly the drawing operation. Such advantages are realized from the use of high temperatures, e. g. 150–200° C., in the case of dry polyhexamethylene adipamide or polyhexamethylene sebacamide, that it is possible to spread the points of application of tension considerably farther apart than is possible when the drawing is done at room temperature. Similar good results are obtained by drawing in warm water or steam at 60–110° C.

Referring to Fig. 2 particularly: Rolls 16, 17, and 18 are geared together and are approximately of the same size. Rolls 19, 20, and 21 are geared together and run at approximately four times the speed of 16, 17, and 18. Usually, rolls 16, 18, 19, and 21 are covered with rubber and rolls 17 and 20 are of metal. In this machine, the undrawn filament passes in between rolls 16 and 17, around roll 17, between rolls 17 and 18, and then between rolls 19 and 20, around roll 20, and out between rolls 20 and 21. Between rolls 17 and 18, and 19 and 20 the filament is elongated to four times its original length. It is an important feature of any machine used for drawing highly tapered bristle that the points between which drawing tension is applied be quite close together. In this particular machine the rolls are 1.06 inches in diameter and the distance between centers of rolls 19 and 17 is about 1.2 inches. The closer the draw points are together, the more satisfactory will be the drawing. In general, machines in which the draw points are further apart than one-half the distance between the thickest and thinnest sections in the drawn filaments have given poor results unless the filaments are heated.

Referring to Figs. 3 and 4 particularly: Wood handle 22 and metal ferrule 23 are of conventional form, as is the hard rubber member 24 in which the butts 25 of the bristles 26 are set. The novel taper of the bristles from butts 25 to points 27 is the characteristic feature of this embodiment of the invention.

Referring to Figs. 5–7 particularly: Fig. 5 shows a bristle having a concave taper from butt 28 to tip 29, Fig. 6 one having a uniform taper from butt 30 to tip 31, and Fig. 7 one having a convex taper from butt 32 to tip 33; each of which bristles is readily produced by the process of the invention. It will be noted that the bristle of Fig. 6 is a true truncated cone, and that the bristles of Figs. 5 and 7 also belong, though roughly, in the same geometrical category. The tips 29, 31 and 33, however, may readily be made pointed, or more pointed, as shown in Fig. 12, or given a chisel edge contour, by the application of an abrasive surface, e. g. an abrasive wheel, thereto, as shown in Fig. 13.

Referring to Figs. 8 and 9 particularly: Bristles 34, prepared in accordance with Example IV hereinbelow, i. e. tapered from each end to a thick center section 35, are looped about a core member 36, which, as best shown in Fig. 9, may be integral with handle member 37, and then are fixed securely into position by compression retaining members 38, 39, and 40, which also, as shown in Fig. 9, may be integral with the aforesaid handle member 37 and core member 38. It will be noted that one set of bristles may readily be replaced with another merely by manual spreading of the said retaining members, the resilience of the latter serving on termination of such spreading, to secure the new set in position about the aforesaid core member 36.

The following examples will show more fully a preferred method for carrying out the invention:

EXAMPLE I

Employing an apparatus like that shown in Fig. 1, molten polyhexamethylene adipamide, containing 0.2% of finely divided carbon black and having a melt viscosity measured at 285° C. of about 660 poises, was extruded through an eight hole spinneret into a quenching bath 12. Each hole of the spinneret was 0.020 inch in diameter and the spinneret face was 0.25 inch from the surface of the water. In the quenching bath, the filaments passed around the guide 5 having a diameter of about 4 inches—which was used to insure against damping of the take-off motion by passage of the filament around sharp corners—out of the bath to the pair of pinch rolls 6, of 6 inches circumference, which govern the take-off rate. The pinch rolls were driven as indicated in Fig. 1. The meshing gear 13 was one-half as large as 14 so that the increase and decrease in speed accompanying each revolution of the elliptic gear occurred twice during each revolution of the pinch rolls. The driving elliptical gear was rotated at a constant speed by the electric motor 8, the speed of which could be changed mechanically so as to secure different diameters of filaments if desired. The ratio of the high speed to the low speed of the elliptic gear was 3.15. The diameter of the filaments obtained in this manner was 0.012 inch at the thick section and 0.007 inch at the thin section, with a distance between the thick and thin sections of about 1.5 inches. The filaments were soaked 16 hours in water and cold drawn to approximately four times their original length, using the machine shown in Fig. 2. While held in a straight position and under sufficient tension to prevent linear shrinkage, the filaments were immersed in boiling water for 30 minutes. After removal from the water and drying, the filaments were cut at the thick and thin sections to give bristles approximately 6 inches long, the diameters of which were about 0.006 inch at the thick ends and 0.0035 inch at the thin ends.

Tapered bristles made up in a similar manner, but by using various sets of meshing gears 13 and 14 to obtain various lengths, and different elliptic gears to secure other taper ratios, were employed in the formulation of a 4 inch flat wall paint brush 1.06 inches thick, as shown in Table I.

TABLE I

*Formulation of paint brush made up from tapered polyamide bristle*

| Per cent by weight | Diameter in mils | | Length of bristles in inches | |
|---|---|---|---|---|
| | Large end | Small end | As originally cut | As trimmed for use |
| 30 | 10 | 4 | 6 | 5-4 |
| 30 | 10 | 4 | 5.5 | 5-4.5 |
| 20 | 10 | 4 | 4.5 | 4.5 |
| 10 | 12 | 6.5 | 6 | 5 |
| 10 | 13 | 5 | 6 | 5-4.5 |

Bristles in the well mixed formulations indicated in the table were pointed at the tips by holding against a disc of revolving sandpaper and then vulcanized into a paint brush handle in the customary manner. The brush thus prepared had good painting qualities.

EXAMPLE II

For the preparation of a uniformly tapered fishing leader, molten polyhexamethylene adipamide having an intrinsic viscosity of 0.88 measured at 25° C. and a melt viscosity of 450 poises at 285° C. was extruded at a constant rate through an orifice 0.04 inch in diameter. The filament thus formed was led through a quenching bath, the surface of which was one inch below the orifice, to a pair of pinch rolls, one of which was round and the other of which had the shape indicated in Table II below. The latter roll (take-off roll) was so designed that when rotating at a constant angular speed, the peripheral speed varied from 1 to about 3.2 during the course of a single revolution. The total perimeter of the roll was 64 inches, so that a regular variation in the diameter of the filament was obtained over 32 inch lengths. After water soaking 16 hours, the filament was cold drawn to four times its original length and cut at the thick and thin sections to give tapered fishing leaders about 128 inches long, in which the diameter of the thick end was about twice that of the thin ends. These tapered leaders were especially useful because of the absence of knots. The resistance of the leaders to kinking was improved by holding them in a straight position under tension in boiling water for two hours. Leaders dyed with blue dye had an appearance which is advantageous for certain types of fishing.

TABLE II

*Take-off roll for preparing tapered leaders*

| Distance in inches along the periphery of the roll measured in either direction from the point of maximum distance from the axis of revolution | Distance in inches from periphery of the roll to the axis of revolution | Relative diameter of filaments at 4 inch intervals |
|---|---|---|
| 0 | 19.00 | 18.00 |
| 4 | 15.80 | 19.75 |
| 8 | 13.32 | 21.50 |
| 12 | 11.40 | 23.25 |
| 16 | 9.83 | 25.00 |
| 20 | 8.58 | 26.75 |
| 24 | 7.57 | 28.50 |
| 28 | 6.73 | 30.25 |
| 32 | 6.02 | 32.00 |

EXAMPLE III

To prepare a tapered fishline, molten polyhexamethylene sebacamide having an intrinsic viscosity of 0.88 measured at 25° C. and a melt viscosity of 450 poises measured at 285° C. was extruded from an orifice 0.125 inch in diameter, at a constant rate, into a quenching bath of water, whose surface was one inch below the spinneret orifice. To withdraw the filament from the quenching bath it was passed around a roll, and the peripheral speed of the roll regulated to produce a constantly accelerating speed for one-half of the cycle and a speed decelerating the same amount for the other half of the cycle. This procedure produced a polyamide filament whose diameter increased uniformly in the first ten feet of length and decreased uniformly during the last ten feet of length, with the diameter of the thickest portion about twice that of the thinnest portion. After soaking in water for 16 hours, the filament was cold drawn to approximately four times its original length. Following this treatment the filament was smooth, strong, flexible and tough, and when cut at the thin sections was useful as a tapered fishline.

EXAMPLE IV

Uniformly tapered cold drawn filament having a diameter at the thin portions of four mils and at the thick portions of 10 mils, and having a distance of six inches between the thin and thick portions, was cut at the thin portions to give bristles 12 inches long, tapered from each end to a thick center section. These bristles were fabricated into a novel type of paintbrush, as follows. The bristles were bent so that the thin ends were brought together, i. e., doubled over about the center. The thick sections were then fastened to the handle of a paintbrush in such a way that the ferrule of the paintbrush covered the bent section of the bristles and the thin ends projected in the same manner as in a conventional paintbrush. The bristle was secured in the paintbrush handle by passing a bar through a loop made by the bristles at the bent section and fastening the bar securely at each end. The brush thus made from the U-shaped bristle was useful for painting, and was characterized by extremely good anchorage of the bristle; that is, the bristles would not readily pull out or be lost during painting. This procedure constitutes a novel method of making a paintbrush.

EXAMPLE V

The following modification of the invention illustrates the preparation of a tapered bristle having a flanged tip or end.

A composition consisting of 80 parts by weight of polyhexamethylene sebacamide and 20 parts by weight of p-tertiary butyl phenol-formaldehyde resin was spun from melt at about 260° C. through a spinneret having 10 holes, each hole having a diameter of 0.020 inch, using the apparatus shown in Fig. 1. The extruded filaments coalesced to form a single tapered filament on entering a bath of water placed about 0.5 inch below the face of the spinneret. As a result of the more rapid solidification of the thinner sections of the initial filaments, there was less adhesion of these portions than of the thicker portions of the filaments. Upon cold drawing the resultant monofil and cutting it at the thick and thin sections, the small portions (tips) split apart to give the desired flag at the small ends of the bristles. The cold drawing operation was effected with the use of the apparatus shown in Fig. 2. The portion of the monofil subjected to drawing tension, i. e. the portion between rolls 18 and 20, was subjected to steam treatment during the drawing. After drawing, the thick and thin sections of the monofil were 8 inches apart and the taper rate was about 2.0. The average diameter of the monofil was approximately 0.025 inch.

Flagged bristles can also be prepared in a similar manner from polyamides which do not contain a resin modifying agent. When this is done, however, it is usually necessary to pass the filaments through a guide placed at the entrance into the quenching bath, in order to secure proper coalescence of the filaments. The operation is not limited to a specific size, number, or arrangement of the holes in the spinneret, but a close spacing of the holes facilitates the coalescing process. Furthermore, a close spacing of the holes in the spinnert reduces the tendency of the extruded polymer to form a ribbon rather than a round structure.

This invention is not limited to the preparation of tapered filaments from the polymers mentioned in the foregoing examples. As already indicated, the invention is applicable broadly to filament-forming synthetic polymers. The preferred polymers are polyamides of the types described in U. S. Patents 2,071,250, 2,071,253, and 2,130,948. These polyamides may be prepared from bifunctional polyamide-forming reactants and contain amide groups as an integral part of the main chain of atoms in the polymer. It is not essential that the linking groups in the polymer chain consist solely of amide groups; the chains may also contain other groups, e. g. ester groups.

The polyamides are of two general types, those derived from diamines or amide-forming derivatives thereof and suitable dicarboxylic acids or amide-forming derivatives of dibasic carboxylic acids, and those derived from polymerizable amino acids or amide-forming derivatives thereof, e. g. esters and lactams. On hydrolysis with hydrochloric acid the polyamides yield polyamide-forming reactants; polyamides of the diamine-dibasic acid type yield a diamine hydrochloride and a dibasic carboxylic acid, whereas those of the amino acid type yield an amino acid hydrochloride. As specific examples of such polyamides may be mentioned polydecamethylene adipamide, polyhexamethylene sebacamide, polypentamethylene sebacamide, polyoctamethylene adipamide, 6-aminocaproic acid polymer, and 11-aminoundecanoic acid polymer. Mixtures of polyamides and interpolyamides may also be used. Examples of such interpolyamides are those derived from hexamethylenediamine, decamethylenediamine, adipic acid and sebacic acid, and from hexamethylenediamine, adipic acid, and 6-aminocaproic acid. As examples of polyamides containing groupings other than amide groupings may be mentioned ester-amide interpolymers, such as may be derived from a diamine, a dibasic acid, and a glycol, or from an amino acid and an hydroxy acid. The term "polyamide" as used in this application includes polymers containing a plurality of groups of structure

wherein X is oxygen or sulfur, regardless of the nature of the atom to which the indicated free linkages are attached. The term includes polymers derived from a glycol and a diisocyanate or a diisothiocyanate.

The tapered filaments of this invention need not necessarily consist wholly of polyamide or modified polyamide. It is frequently desired to deluster and/or color the filaments by adding a pigment to the polymer or to the reactants from which the polymer is prepared. It is also useful in many cases to dye the filament, for example with Calico black, Sudan brown, etc. Thus, fishing lines or leaders may be made to resemble closely water of almost any color or turbidity by the proper choice of dyes or pigments. Bristles may also be made of any desired color. The coloring of bristles by incorporating pigment in the polymer is particularly desirable in such case, since there is no possibility of the color's bleeding out during use.

It will be appreciated that the products of the invention can be obtained in forms having varying cross-sectional composition or make-up, as, e. g., by applying a coating of one or more of the hereinabove-mentioned polymers, by conventional means, to a pre-formed tapered filament or bristle, whether composed of the same or different polymer or polymers. Especially useful types of products result when the tapered filament or bristle is spun from a polyamide having particularly superior qualities of bending elasticity, resilience, flex durability, etc., and the coating consists of a polyamide which specially excels in qualities such as abrasion and wear resistance, etc.

When increased flexibility is desired, as for instance in fishing lines and leaders, the polyamide may be modified with plasticizers, for example, phenols or aryl sulfonamides. Fillers, resins, antioxidants, etc., may also be employed. The use of surface modifying agents or water repellents is usually unnecessary but it is within the scope of this invention to so treat the tapered articles with them. It is also possible to modify the bristles by grinding, splitting, or otherwise altering the tips to improve such properties as paint retention and brushing characteristics.

The invention may utilize methods other than the ones given in the examples for tapering the bristles, inasmuch as it will be apparent from the principles outlined herein that any arrangement may be used which will secure a controllable variation in the mass of polymer passing a given point beyond the spinneret. In addition to using the many kinds of mechanical contrivances such as cams, irregular gears, variable friction devices, etc., appropriate for the purpose, it is possible to secure a variation by reducing the speed of the uniformly rotating take-off rolls below a certain point at which a spontaneous oscillation of the bristle in the quenching bath begins. This oscillation gives a varying rate of take-off of the polymer from the orifice, and a resultant taper. It is also possible to feed the polymer to the orifice at a variable rate and thus to obtain a tapered filament at a constant take-off rate. Or, the same object may be obtained by varying the rates of both feed and take-off.

Although tapered polyamide filaments are particularly useful in paintbrushes and in fishing tackle, their application is not limited thereto. The properties of resilience, resistance to chemical agents, uniformity, sterility, resistance to high temperature, immunity to attack from organisms, and ability to retain their color in use, make them valuable in many other applications, including pastry brushes, bottle brushes, fingernail brushes, polishing brushes, etc. Although taper is not necessary in bristles to be used for toothbrushes, tapered bristles may advantageously be used for this purpose. Further, it is often desirable to use synthetic bristles in admixture with natural bristles to secure improvement in such qualities as wear resistance and resiliency and to reduce the cost.

The tapered bristles of this invention may be used to secure novel decorative effects, e. g., in millinery. The tapered or pointed bristles can also be used as needles, pins, staples, and in making fasteners of the safety-pin type. In addition, they can be used as toothpicks or dental sticks—being especially suitable, when given a chisel-like tip, for cleaning stains from teeth. Similarly, they may readily be adapted, in the thicker sizes, to use as cuticle sticks. These fields of usefulness result from the capacity of the polyamides of the invention for taking and holding a point, or a cutting edge, sufficient for numerous purposes which do not require the keenness or durability of the usual edges imparted to conventional metal cutlery.

Although the invention has been described with particular reference to the preparation of large filaments, it is also applicable to the preparation of small filaments for use in yarns and fabrics.

Notwithstanding the fact that the tapered filaments are most useful after cold drawing, it is within the scope of the invention to use them in the unoriented condition, i. e., without cold drawing. Specifically, it is possible, e. g., to use the undrawn tapered bristles in brushes.

As already shown, the process of this invention makes possible the preparation of tapered articles which are far superior, in many respects, to the corresponding articles now in use. The taper of bristles can be controlled and regulated to the desired value, bristles can be made of any specified length, and a mechanical cutting device can be operated in conjunction with the drawing machine, thus rendering the process almost completely automatic. The uniformity in size and shape of the bristles also makes it possible to set up definite standards for a particular kind of brush. The bristles are quite resistant to the high temperature necessary for vulcanizing the rubber commonly used in setting the bristles in a brush. Furthermore, the chemical inertness and solvent resistance of the bristles permits the use of many other anchoring materials, such as cement, resins, etc. The bristles may, for example, be attached to the ferrule of the paintbrush by setting the bristles in a solution of methyl methacrylate polymer in methyl methacrylate monomer and completing the polymerization. Brushes can also be made by sealing together by heat fusing the butt ends of a tuft of the bristles, as shown in Fig. 13. Another advantage of the tapered bristles is that they can be produced entirely from domestic materials.

The advantages of tapered polyamide fishing lines and leaders are equally numerous. Leaders can be economically made that are free from knots and possess any desired length and degree of taper. They are smooth and retain their desirable properties well in water, can be used without presoaking, and are highly resistant to deterioration by atmospheric conditions or organisms. Fishing lines may be made in the form of a monofil (single filament) with its inherent advantages of greater density, stiffness, and wearing qualities, at a cost considerably below that of conventional tapered lines. Such lines are smooth, have excellent abrasion resistance, good flexibility, good casting characteristics, and less tendency to tangle than those now in use.

As many apparently widely different embodiments of this invention may be made without departing from the spirit and scope thereof, it is to be understood that I do not limit myself to the specific embodiments thereof except as defined in the appended claims.

I claim:

1. A tapered filament of substantially uniform composition throughout and comprising an oriented synthetic linear polymer, said tapered filament having a taper ratio of at least 1.5 and being oriented substantially uniformly over its entire length.

2. An oriented synthetic linear polyamide bristle of substantially uniform composition throughout and tapering uniformly from the large to the small end in which the ratio of the diameter of the large to the small end is between 1.5 and 3.5, said bristle having a length between 2.5 and 12 inches, said tapered bristle being oriented substantially uniformly over its entire length.

3. A brush comprising oriented synthetic linear polyamide tapered bristles of substantially uniform composition which have a taper ratio between 1.5 and 3.5, and which are oriented substantially uniformly over their entire length.

4. A brush comprising a plurality of pairs of bristles, each of which pairs consists of a synthetic linear polymer monofil having its maximum diameter at its central portion, and having a taper in the direction of each end; the said central portion being secured to the body of the brush, and both halves of the monofil being aligned in mutually parallel relationship, pointing in the same direction.

5. A tapered oriented artificial bristle having a flagged tip, the composition of said bristle being uniform throughout and comprising synthetic linear polyamide, said tapered bristle having a taper ratio of at least 1.5.

6. A tapered oriented artificial bristle having a flagged tip, said bristle comprising a mixture of synthetic linear polyamide and phenol-formaldehyde resin.

7. A tapered artificial bristle comprising a plurality of oriented tapered filaments composed essentially of synthetic linear polyamide, the said filaments being arranged with their portions of maximum and minimum thickness, respectively, in mutual and substantially parallel juxtaposition, the said filaments being fusion sealed together at the portions of maximum thickness and substantially throughout their length but the said portions of minimum thickness being mutually separable to form a flagged tip.

8. A tapered artificial bristle having a flagged tip, said bristle comprising a plurality of oriented tapered filaments composed essentially of a mixture of synthetic linear polyamide and phenol-formaldehyde resin, the said filaments being arranged with their portions of maximum and minimum thickness, respectively, in mutual and substantially parallel juxtaposition, the said filaments being fusion sealed together at the portions of maximum thickness and substantially throughout their length but the said portions of minimum thickness being mutually separable to form a flagged tip.

9. A tapered oriented artificial bristle comprising a mixture of synthetic linear polyamide and phenol-formaldehyde resin.

10. The tapered filament set forth in claim 1 in which said polymer is an oriented synthetic linear polyamide.

11. The tapered filament set forth in claim 1 in which said polymer is oriented polyhexamethylene sebacamide.

12. The tapered artificial bristle set forth in claim 9 in which said polyamide is polyhexamethylene sebacamide.

ALBERT FARIS SMITH.